United States Patent [19]
Senechal et al.

[11] Patent Number: 6,049,578
[45] Date of Patent: Apr. 11, 2000

[54] DIGITAL PLANT PROTECTION SYSTEM

[75] Inventors: Raymond R. Senechal, East Hartford; Gary D. Althenhein, Enfield; Donald D. Zaccara, Winsted; Stephen G. Bransfield, Kensington; Robert E. Bryan, Bloomfield, all of Conn.; Arthur G. King, Southwick, Mass.; Glenn J. McCloskey, Canton, Conn.; Frank J. Safryn, East Granby, Conn.; Stephen J. Wilkosz, Vernon, Conn.; Paul L. Yanosy, Enfield, Conn.

[73] Assignee: ABB Combustion Engineering Nuclear Power, Inc., Windsor, Conn.

[21] Appl. No.: 09/069,869

[22] Filed: Apr. 30, 1998

Related U.S. Application Data

[60] Provisional application No. 60/048,922, Jun. 6, 1997, and provisional application No. 60/048,923, Jun. 6, 1997.

[51] Int. Cl.[7] .............................. G21C 7/36; G21C 17/00
[52] U.S. Cl. ........................ 376/215; 376/216; 376/259; 364/184; 364/185; 364/186; 364/187; 371/36
[58] Field of Search ............................ 376/259, 215–218; 364/184–187; 371/36

[56] References Cited

U.S. PATENT DOCUMENTS

| 3,892,954 | 7/1975 | Neuner .............................. 235/153 AC |
| 4,054,486 | 10/1977 | Lefebvre et al. ...................... 176/20 R |
| 4,434,132 | 2/1984 | Cook ....................................... 376/259 |
| 4,588,547 | 5/1986 | Impink, Jr. et al. ..................... 376/254 |
| 4,661,310 | 4/1987 | Cook et al. .............................. 376/259 |
| 4,692,299 | 9/1998 | Crew et al. .............................. 376/216 |
| 4,752,869 | 6/1988 | Miller et al. ............................ 364/187 |
| 5,621,776 | 4/1997 | Gaubatz ................................... 376/242 |
| 5,832,049 | 11/1998 | Metro et al. ............................ 376/216 |
| 5,859,884 | 1/1999 | Metro et al. ............................ 376/259 |

FOREIGN PATENT DOCUMENTS

| 0 145 188 A | 6/1985 | European Pat. Off. . |
| 2494034 | 5/1982 | France .................................. 361/139 |
| 42 16 699 A | 11/1993 | Germany . |
| 44 14 860 A | 11/1995 | Germany . |
| 195 17 164 A | 11/1996 | Germany . |

*Primary Examiner*—Charles T. Jordan
*Assistant Examiner*—Jack Keith
*Attorney, Agent, or Firm*—Rader, Fishman & Grauer; Ronald P. Kananen

[57] ABSTRACT

A digital plant protection system for use in nuclear power plants of the pressurized water type includes cross-connected sensed-parameter processing channels that provide a suitably conditioned digital value to a digital comparator that tests the conditional digital value against a predetermined value to determine whether or not the sensed parameter has been exceeded. A comparator is associated with each of the plural channels and receives a separate measurement of the sensed parameter for each channel. If a sensed-parameter is determined to be out-of-specification by 2 of 4 or more channels, a 'trip' signal is generated to effect remedial action.

32 Claims, 15 Drawing Sheets

(SUBMODULE CARRIER BOARD)

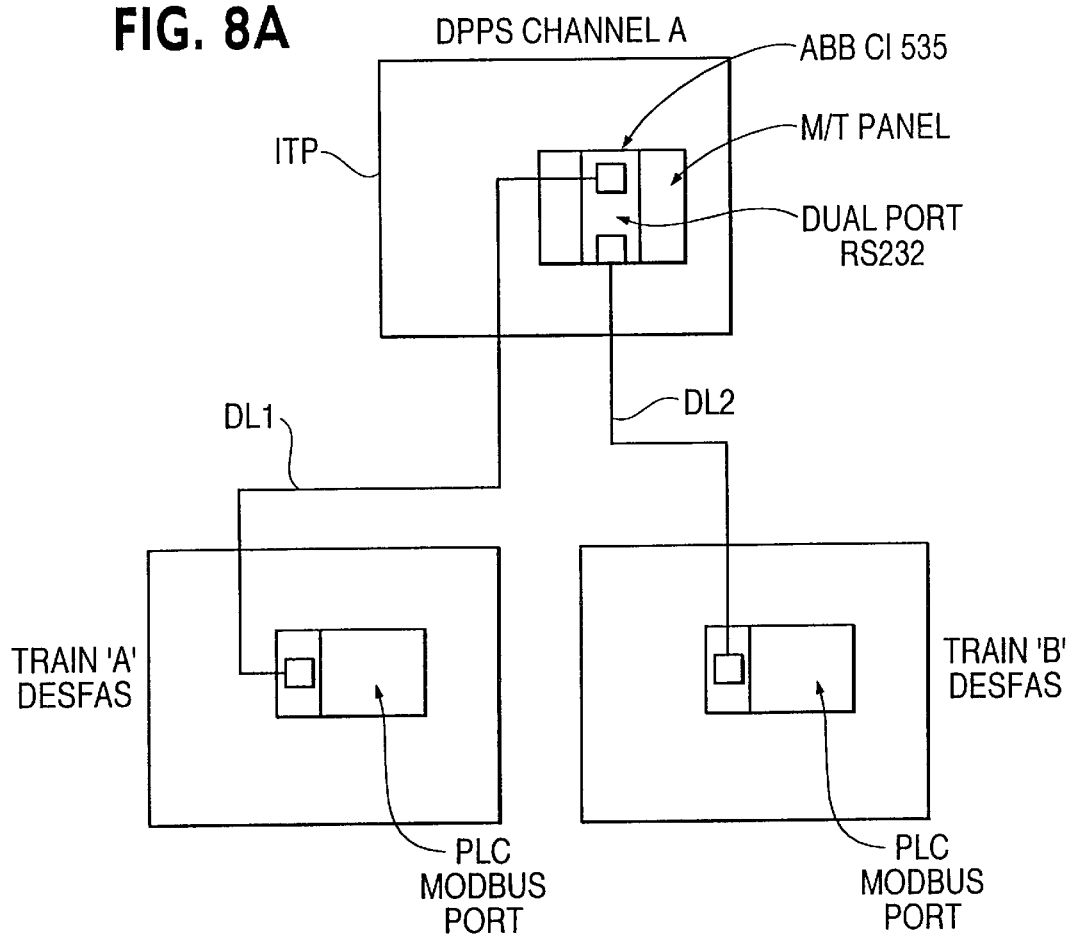

DIGITAL PLANT PROTECTION SYSTEM

The subject matter of the present application is disclosed in applicants' co-pending Provisional U.S. Patent Application Nos. 60/048,922 and 60/048,923, both filed Jun. 6, 1997, from both of which priority is claimed.

CROSS REFERENCE TO RELATED APPLICATION

The subject matter of this provisional application generally relates to the subject matter in pending U.S. application Ser. No. 08/848,556, filed Apr. 29, 1997, based on a provisional application filed on Jun. 20, 1996, the disclosure of which is incorporated herewith for completeness of disclosure. In addition, the subject matter of this application is related to that disclosed in pending U.S. application Ser. No. 09/076,094 filed on May 12, 1998 by the present inventors and entitled "Digital Engineered Safety Features Actuation System." the subject matter of which is incorporated herein by reference.

BACKGROUND OF THE INVENTION

The present invention relates to digital plant protection systems for nuclear power plants and, more particularly, to a Digital Plant Protection System (DPPS) for pressurized water reactors.

In nuclear power plants, independent shut-down and safe-operation systems are dedicated to monitoring plant operation and evaluating numerous safety-related parameters. In the event one or more measured parameters indicate the existence of an unsafe condition, the shut-down system designed to mitigate the effects of an anticipated transient condition and/or the safe-operation system can automatically effect the appropriate remedial action. It is imperative that these safety control systems, known as plant protection systems, operate reliably, and accordingly, it is imperative that all measured and sensed parameters be valid.

In the context of nuclear plant protection systems, it is not uncommon to measure a multitude of parameters related to plant operation. These parameters include, for example, temperatures, pressures, flow rates, power density, neutron flux, fluid levels etc. Other functions of the plant protection system include the status-monitoring of various components including valves, pumps, motors, control devices and generators.

Additionally, the plant protection system, under certain defined conditions, may initiate a reactor trip (RT), i.e., the rapid, controlled, and safe shut-down of the reactor by actuating various field systems and remote actuation devices. In the case of a pressurized light water reactor, the shut-down is often accomplished by the dropping of moderating control rods into the reactor core to cause the reactor to become sub-critical.

In co-pending U.S. application Ser. No. 08/848,556 noted above, an invention for use in the nuclear industry is disclosed for providing an Automatic Self-Testing system for remote sensors utilizing multi-sensor, multi-channel redundant monitoring and control circuits. The system senses or measures a parameter by a plurality of independent and sensor specific processing paths, each of which is provided with parallel redundant sub-paths that can each be sequentially inserted into the processing path to effect normal processing or be disassociated from the processing path to effect testing. Each sensor provides, either directly or indirectly, a digital value to a comparator which compares the measured value with a predetermined value that is, in turn, provided to coincidence logic that evaluates the output of its comparator with the input of the comparators of the other processing paths to provide an output indicative of a pass/fail condition. That invention advantageously provides an automatic self-testing system for verifying both the signal path processing functions and the validity of various logic states in parameter sensing systems, particularly parameter sensing systems using multiple redundant processing paths.

In copending U.S. Provisional Application Ser. No. 60/048,923, noted above, an invention for use in the nuclear industry is disclosed for providing a Digital Engineered Safety Features Actuation System (DESFAS) which acts as an interface between a Plant Protection System and Engineered Safety Features in a nuclear power plant. The DESFAS continuously monitors the Plant Protection System initiation circuit for each remotely actuated Engineered Safety Feature system to effect remedial action in the event that the Plant Protection System generates a 'trip' signal. By using actuation inputs from the Plant Protection System and manual, operator implemented inputs, controls are provided for remote equipment components, such as solenoid valves, motor operated valves, pumps, fans and dampers. Together, the DPPS of the present invention, the Automatic Self Testing System described above and the DESFAS described above constitute a nuclear plant reactor protection system.

Most plant protection systems in use are of the analog variety in which analog values are processed via dedicated hard-wiring to various active devices, e.g., operational amplifiers. These systems are typically complex and require substantial maintenance. More problematic, however, is the functional "drift" associated with the use of numerous operational amplifiers.

Operational amplifier drift is a condition in which the gain of the amplifier changes over time, usually due to the aging of the semiconductor material and the resistive and capacitive devices within the operational amplifier.

As can be appreciated, in a worst case situation, drift errors can concatenate to produce less than valid output values. Analog systems can be particularly difficult to troubleshoot where the problem is an out of specification component that is otherwise fully operational. Thus, the problem of locating those operational amplifiers that have drifted to an out-of-specification condition can be time consuming and, of course, expensive.

The problem of operational amplifier drift has been addressed at the design stage by incorporating risk/uncertainty factors that are larger than those required if drift was not a problem. These risk/uncertainty factors oftentimes require the power plant to operate at lower power output levels than otherwise would be possible.

SUMMARY OF THE INVENTION

It is an object of the present invention to provide a plant protection system for use with pressurized water reactors that is primarily digital and which has a greater mean time between failures.

It is another object of the present invention to provide a plant protection system that is simpler to maintain than prior analog systems.

It is still another object of the present invention to provide a plant protection system that offers convenient expandability and extensive self-diagnostic capability.

It is still a further object of the present invention to provide a plant protection system that utilizes substantially less wiring than prior systems.

It is still a further object of the present invention to provide a plant protection system that has an open architecture to allow convenient connection to other electronic systems utilized in a nuclear power plant.

The present invention provides a Digital Plant Protection System (DPPS) for use in nuclear power plants of the pressurized water type. The system is characterized by a plurality of cross-connected sensed-parameter processing channels that provide a suitably conditioned digital value to a digital comparator that tests the conditioned digital value against a pre-determined value to determine whether or not the pre-determined value has been exceeded. A comparator is associated with each of the multiple channels and receives a separate measurement of the sensed parameter for each channel. If a sensed-parameter is determined to be out-of-specification on a two-out-of-four basis, a 'trip' signal is generated to effect remedial action.

The present invention advantageously provides a digital plant protection system that utilizes digital signals that provide a system that overcomes the problems associated with drift in prior analog systems and which has increased operational reliability, maintainability, reconfigurability, and connectivity to other systems.

Other objects and further scope of applicability of the present invention will become apparent from the detailed description to follow, taken in conjunction with the accompanying drawing, in which like parts are designed by like reference characters.

BRIEF DESCRIPTION OF THE DRAWING

FIG. 8A is a schematic block diagram of a single channel showing the manner by which a interface & test processor communicates with two separate trains for the engineered safety system.

DESCRIPTION OF THE PREFERRED EMBODIMENT

Figure 1:
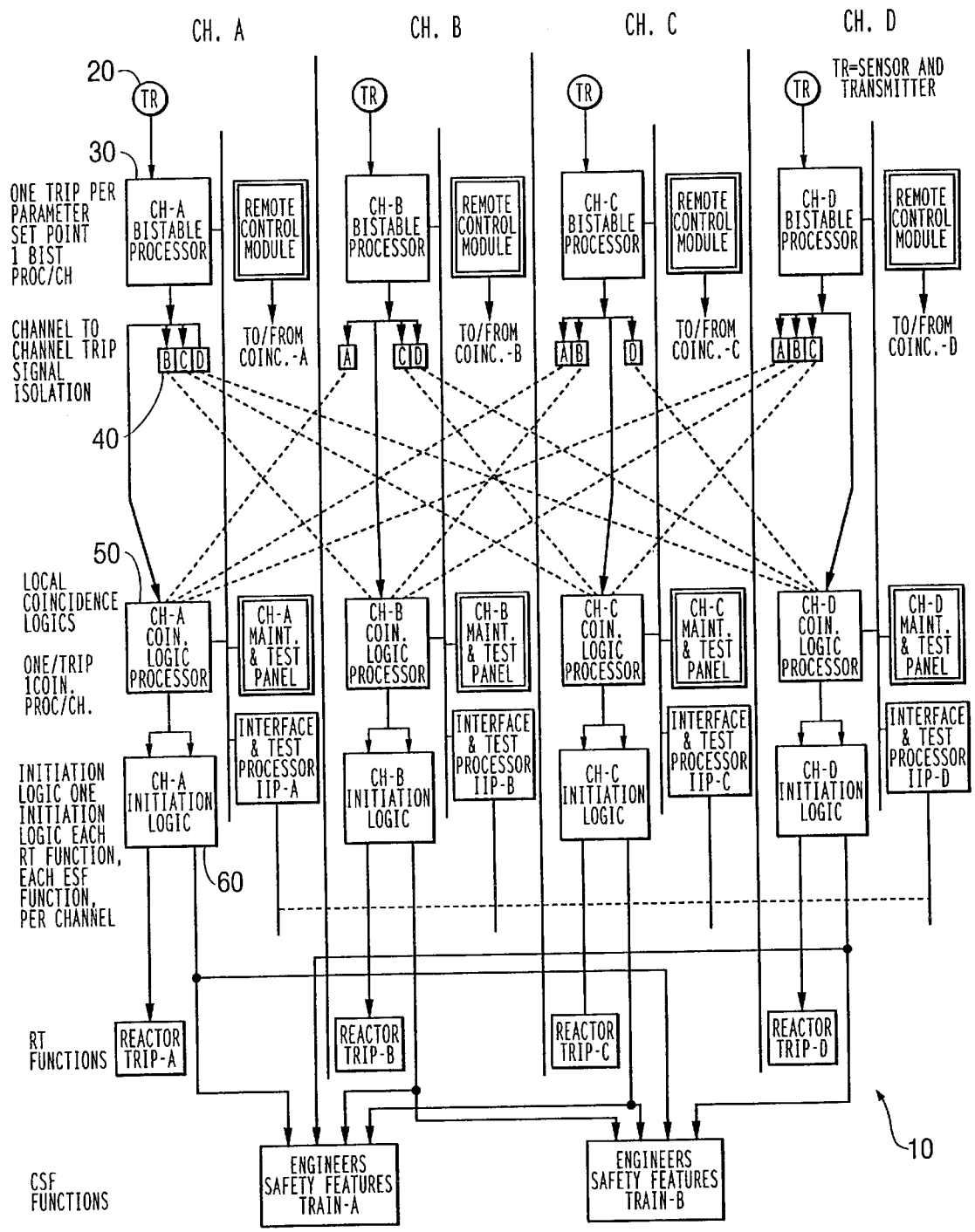
FIG. 1 is schematic block diagram of a four safety-channel system and their internal components.

The overall functional organization of the present invention is shown in schematic block form in FIG. 1 and designated generally therein by the reference character 10. As shown in FIG. 1, the system 10 is divided into four separate channels, Ch. A, Ch. B, Ch. C, and Ch. D. The channels are physically separated from one another as indicated by the solid vertical lines separating the channels. As explained below, however, the various channels are cross-connected with each other by optical fiber communication paths. Each channel includes a bistable processor 30, a trip signal distributor 40, a coincidence logic processor 50, and initiation logic 60.

The bistable processor of each channel accepts the output of the sensor 20 associated with that channel. The sensor 20 may be of the analog type that provides an analog signal which is then subject to an analog-to-digital conversion (as explained below in relationship to FIGS. 2 and 3), to provide a digital data word to the bistable processor 30. In the event that the sensor 20 is a direct digital type, i.e., an optical rotary or linear displacement device, the digital output of the sensor 20 may be provided directly to the bistable processor 30. As explained in more detail below, the bistable processor 30 can conduct pretrip and trip testing of the digital sensor value relative to a pretrip value and a trip value. In the context of FIG. 1, in the event a trip condition is detected, a 'trip' signal is provided to the coincidence logic processor 50 of channel A as well as to the coincidence logic processors 50 of the other channels, viz., Ch. B, Ch. C, and Ch. D. The connection between the Ch. A of FIG. 1 and the other channels is shown in dotted line illustration to indicate a fiber optic connection, which connection provides a desired electrical isolation between the channels. The coincidence logic processor 50 determines if a 2of4 condition (i.e., a 2-out-of-four condition) exists for a 'trip' condition relative to its four inputs, i.e., its local input from its trip signal distributor 40 and the 'trip condition' signal from the other three channels, i.e.. Ch. B. Ch. C, and Ch. D. If a 2of4 condition is detected, the initiation logic 60 provides the necessary signals to effect a reactor trip (RT) and actuate the digital engineered safety features. A reactor trip can involve causing the reactor control rods to drop into the reactor core to arrest operation of the core.

Figure 2:
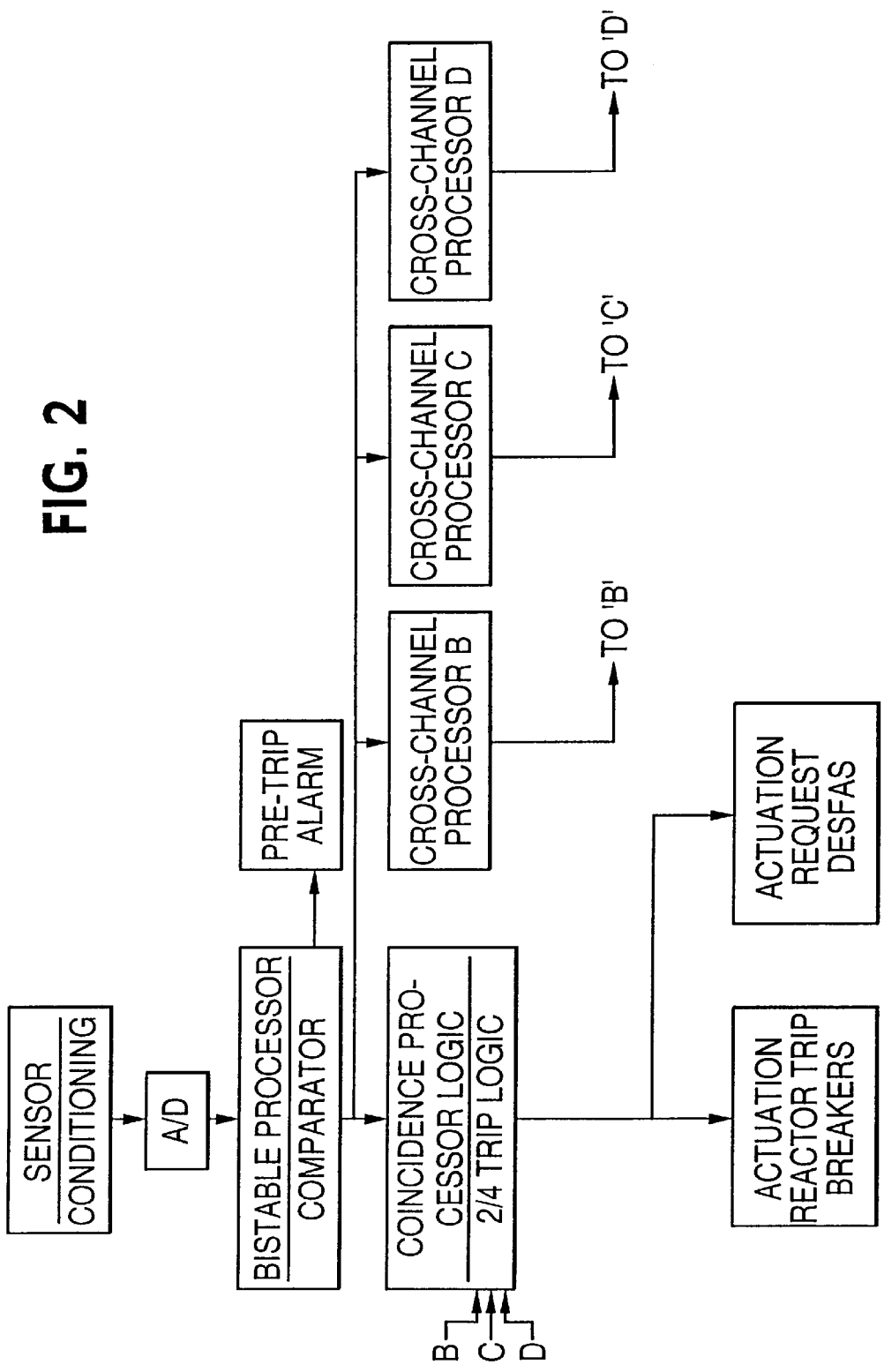
FIG. 2 is a detailed block diagram of a single safety-channel.

FIG. 2 illustrates the functional organization of a single channel, channel A, of FIG. 1. As shown, the sensor 20 output, which can be subjected to signal conditioning (filtering, scaling, amplification, etc.) is provided to an analog-to-digital (A/D) converter 25 to provide a digital data word as an output. The digital data word is presented to the bistable processor 30 which effects an initial comparison of the data word with a pre-stored value indicative of a pretrip condition. A pretrip condition is a pre-determined point or value of the digital data word which approaches a trip condition while still allowing manual or system intervention to prevent a reactor trip. When the bistable processor detects a pretrip condition, a pretrip alarm is actuated (i.e., "set") to alert a reactor operator of a possible impending trip condition. Thereafter, the data word is tested against another pre-stored value indicative of a trip condition, and, if a trip condition is detected, a "trip" output is provided to the coincidence logic unit 50 of Channel A as well as to the coincidence logic units of the other channels, i.e., channels B, C, and D via the cross channel processors. In the event that a 2of4 (2 out of 4) condition exists, a trip signal actuates the Reactor Trip Breakers and the Digital Engineered Safety Features Actuation System (DESFAS).

Figure 3:
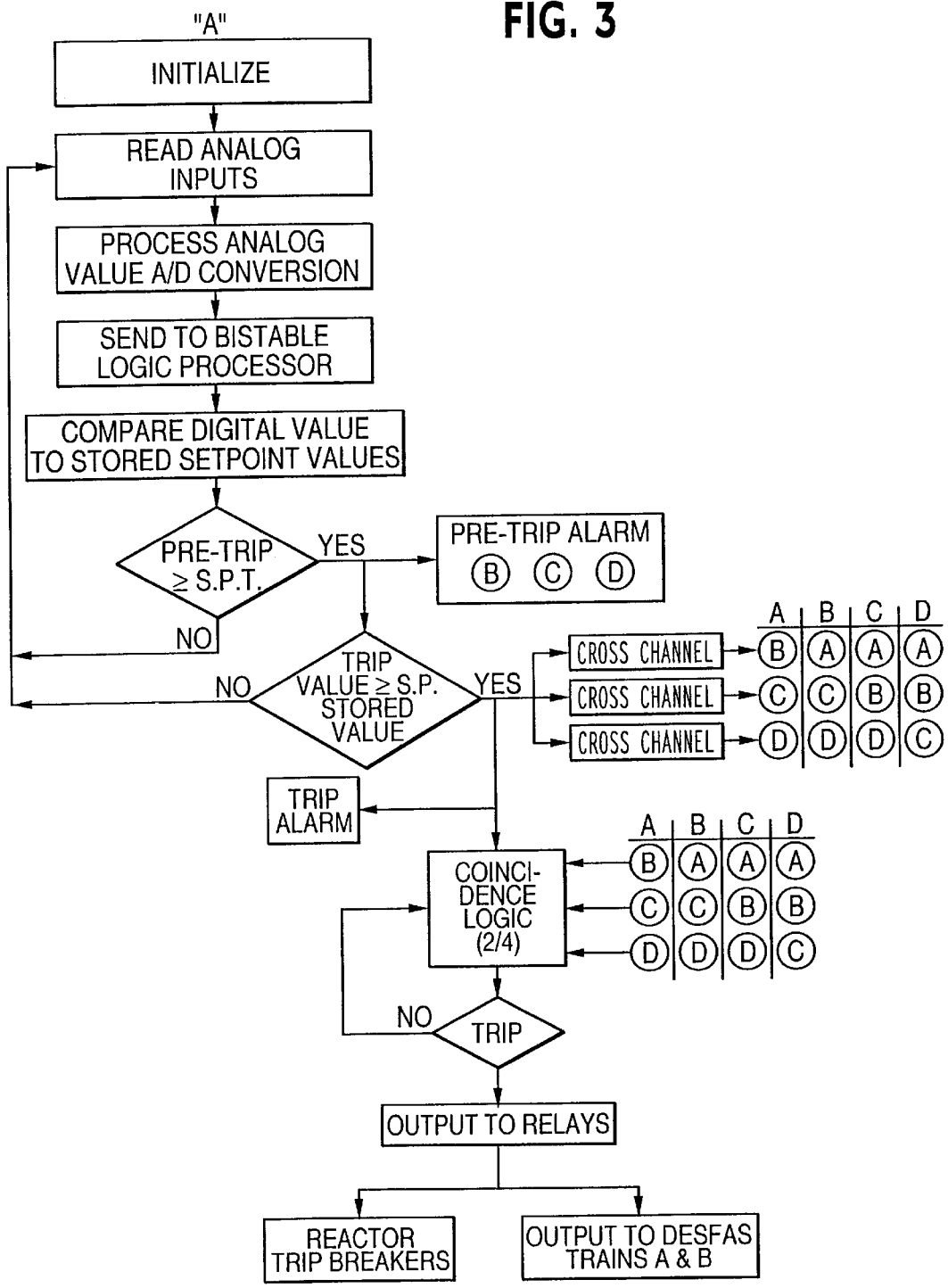
FIG. 3 is a flow diagram illustrating the overall function of the four safety-channels of FIG. 1.

The functional sequence of an individual channel of FIG. 1 is presented in FIG. 3; while the flow diagram of FIG. 3 represents the functional sequence of a single channel, it is representative of the functional flow of the other channels. As shown, the system is initialized and the analog output of the various sensors 20 is read and inputted into the channel. Thereafter, the analog input values are subject to an analog-to-digital conversion to provide a multibit data word that is then transferred to the bistable logic processor 30. The bistable logic processor 30 then compares the digital data words to stored setpoint values to determine if a pre-trip condition exists; if a pretrip condition does not exist (i.e., the measured value is within specification), the operational flow returns to read analog inputs step to repeat the operational process. If a pre-trip condition is determined to exist, a pre-trip alarm signal is sent to the other processing channels and to the operator. Since the flow diagram of FIG. 3 is representative of Channel A of FIGS. 1 and 2, the pre-trip alarm signal is sent to channels B, C, and D. The pre-trip alarm signal actuates an alarm to indicate the pre-trip condition that may be a pre-cursor to a trip condition. If a pre-trip condition is also present, the data word is then subject to a "trip test" in which the value of the data word is compared to a stored value representative of a true "trip" condition. If a true "trip" condition is not detected, the operational flow returns to the read analog input step to repeat the operational flow. If a trip condition is detected, a trip-condition alarm is actuated, and trip-condition signals are sent to the other three channels and stored. Operational flow then proceeds to the 2of4 (2 out of 4) coincidence logic unit which receives the output of the 2of4 coincidence logic units of the other three channels. The trip condition of all four inputs is then evaluated and if at least two inputs indicate a trip condition, the 2of4 logic coincidence unit provides a trip output to a control relay, which, in turn, provides an output to the reactor trip breakers and to the digital engineered safety feature actuation system (DESFAS).

Figure 4:
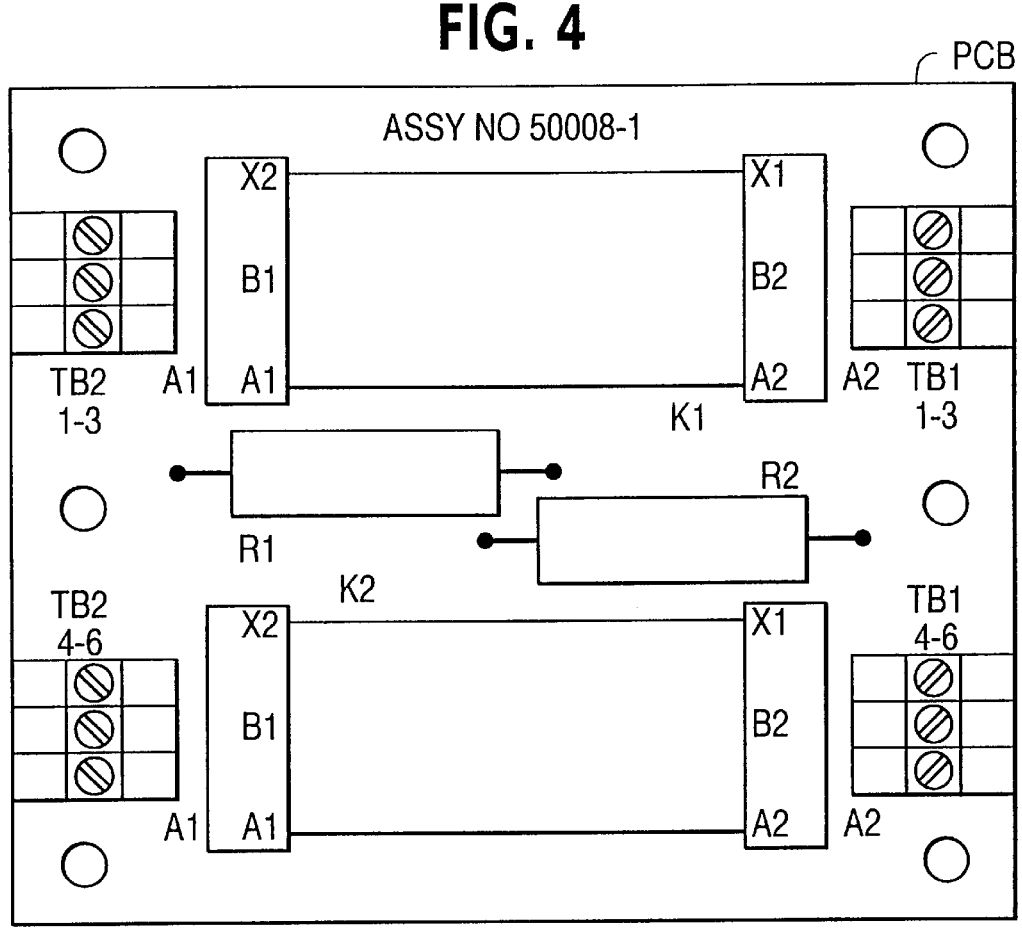
FIG. 4 is a pictorial plan view of a printed circuit board with board-mounted relays and voltage dropping resistors.
Figure 4B:
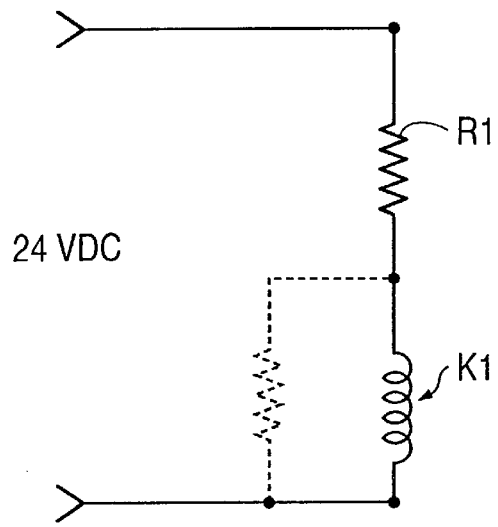
FIG. 4B is a schematic circuit diagram of a voltage-dropping resistor in series with the coil of its relay.
Figure 4A:
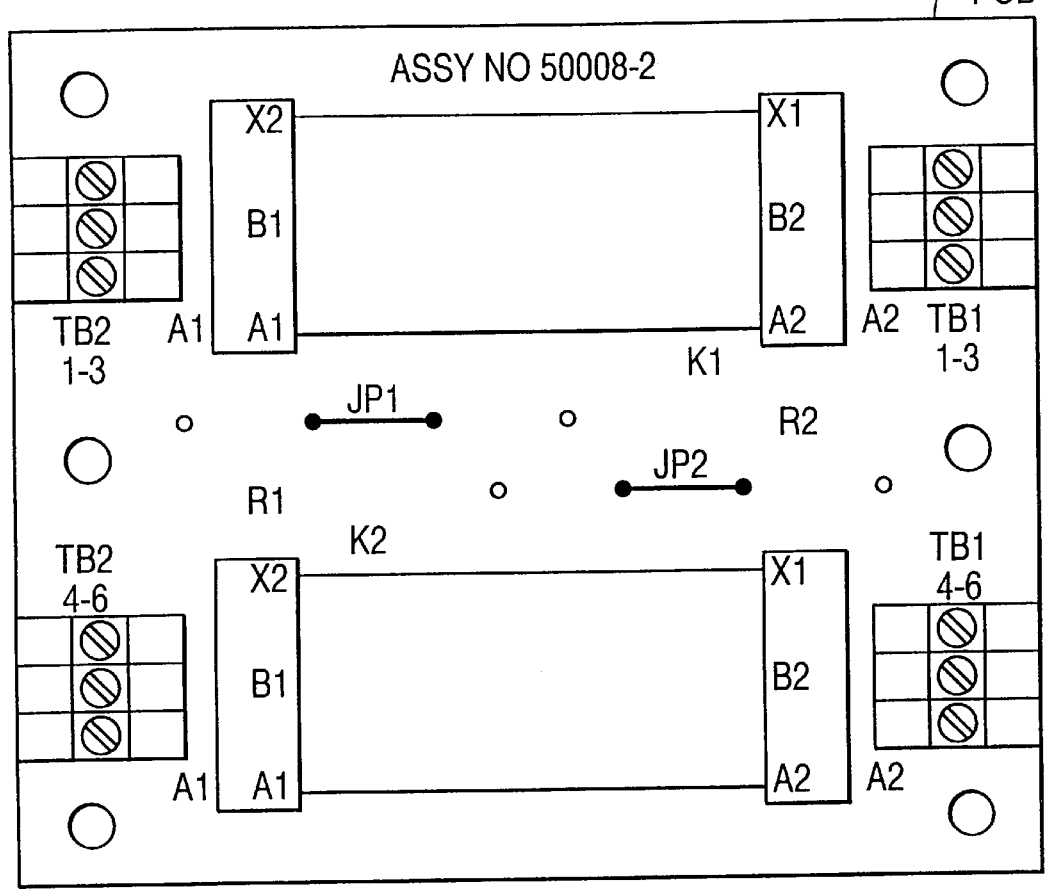
FIG. 4A is a pictorial plan view of the printed circuit board of FIG. 4 with connecting jumpers substituted for the resistors.
Figure 4C:
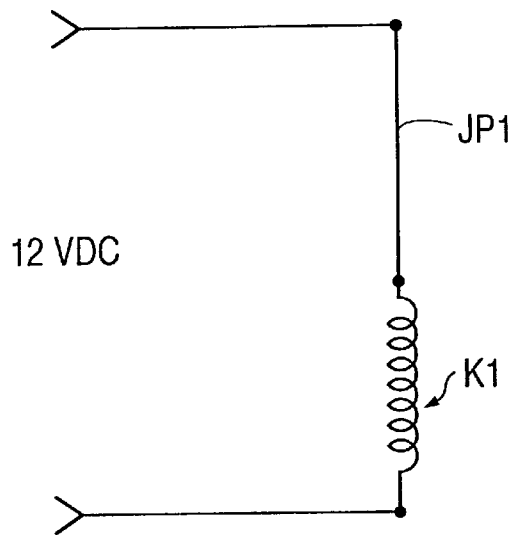
FIG. 4C is a schematic circuit diagram of a jumper wire in substitution for the voltage dropping resistor.

The system utilizes electromechanical relays as part of its operation system. In general, commercial programmable logic controllers (PLC), depending upon their manufacturer, provide a 24 VDC output or a 12 VDC output to energize or de-energize the coil of a power-switching relay. Oftentimes, relays that are optimally suited for a particular power-switching function are those designed to be energized by 12 VDC and these relays must often be mated to a 24 VDC PLC. In order to provide a measure of installation flexibility for 12 VDC relays in those situations in which the relay can be driven by either a 12 VDC or a 24 VDC source, the present invention utilizes a printed circuit board (PCB) mounted relay organization that can be used in either 24 VDC or 12 VDC systems. As shown in FIG. 4, a printed circuit board PCB is provided with two relays K1 and K2 and two voltage-dropping resistors R1 and R2. The relays K1 and K2 have 12 VDC coils and may be obtained, for example, from the KiloVac Corporation. As shown in FIG. 4B (for the relay K1) the voltage-dropping resistor R1 is in series-circuit with the coil of the relay K1. The resistance value of the voltage-dropping resistor R1 is chosen so that the resistor R1 and the coil K1 define a voltage divider that will provide 12 VDC to the coil K1 when the supply voltage is 24 VDC. In this way, a 12 VDC relay can be used with a 24 VDC supply. In the event that the relay K1 is to be used with a 12 VDC supply, the voltage-dropping resistor R1 is removed and a wire jumper JP1 is wired or otherwise inserted into the circuit in substitution for voltage dropping resistor R1. As shown in the diagram of FIG. 4C, the jumper JP1 allows the 12 VDC coil K1 to be connected directly to a 12 VDC source. The circuitry for the relay K2 is the same as described for the relay K1. In FIG. 4B, a second resistor (unnumbered) is shown in dotted line illustration; this second resistor may used use to define a true voltage divider with the resistor R1 with the operating voltage for the coil of the relay K1 provided from the intermediate connection between the two resistors.

Figure 5:
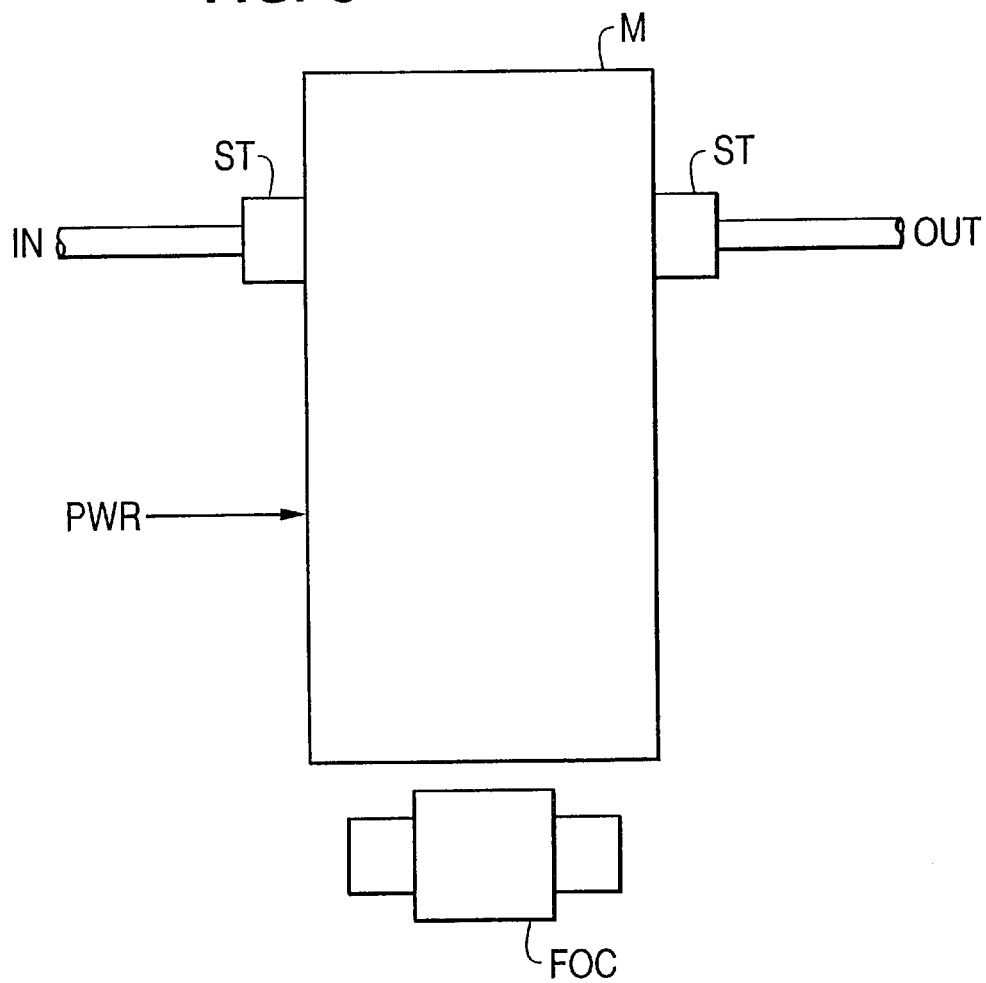
FIG. 5 is a schematic block view of an optical modem.
Figure 5A:
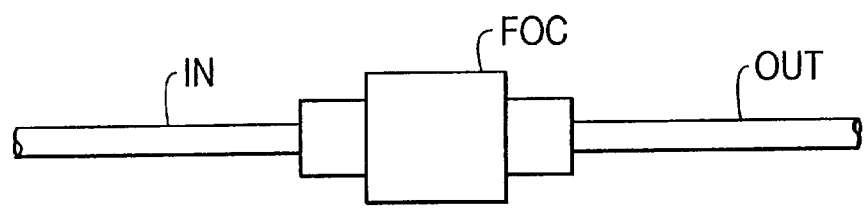
FIG. 5A is a schematic block view of an input and an output optical cable connected together via fiber optic coupling.

The digital plant protection system of the present invention utilizes fiber optic interconnects between its various channel as well as for overall data communication. As part of the fiber optic systems, various electrically powered modems are interposed within the fiber optic circuit. As shown in FIG. 5, a modem M is provided with an input cable IN and output cable OUT, both cables connected to the modem M by conventional connectors ST. Additionally, the modem M is provided with source power PWR. In accordance with the present invention, a conventional fiber optic connector FOC is removably attached or otherwise mounted to or associated with the modem M. For example, the fiber optic connector FOC can be mounted to the modem M by a bracket (not shown) or connected to the modem M by a flexible lanyard. In the event that the modem M undergoes an internal failure or loses power, the modem M may be bypassed by disconnecting the input cable IN and the output cable OUT and connecting these cables together via the fiber optic coupler FOC as shown in FIG. 5A to thereby maintain the physical and optical integrity of the fiber optic pathway.

Figure 6:
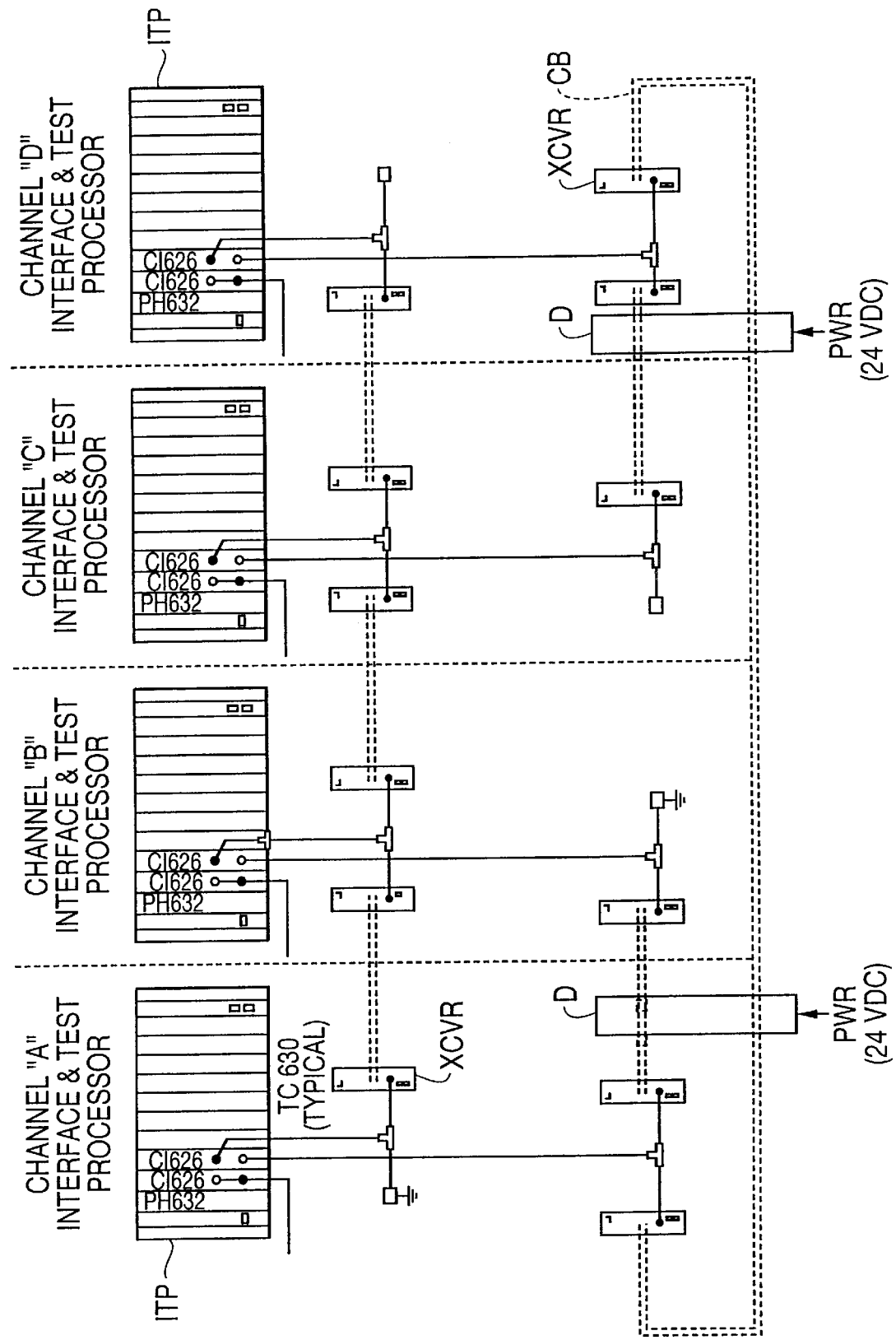
FIG. 6 is a schematic block diagram of four channels in which the interface and test processor of each channel communicates with those of the other channels via a fiber optic bus.
Figure 6A:
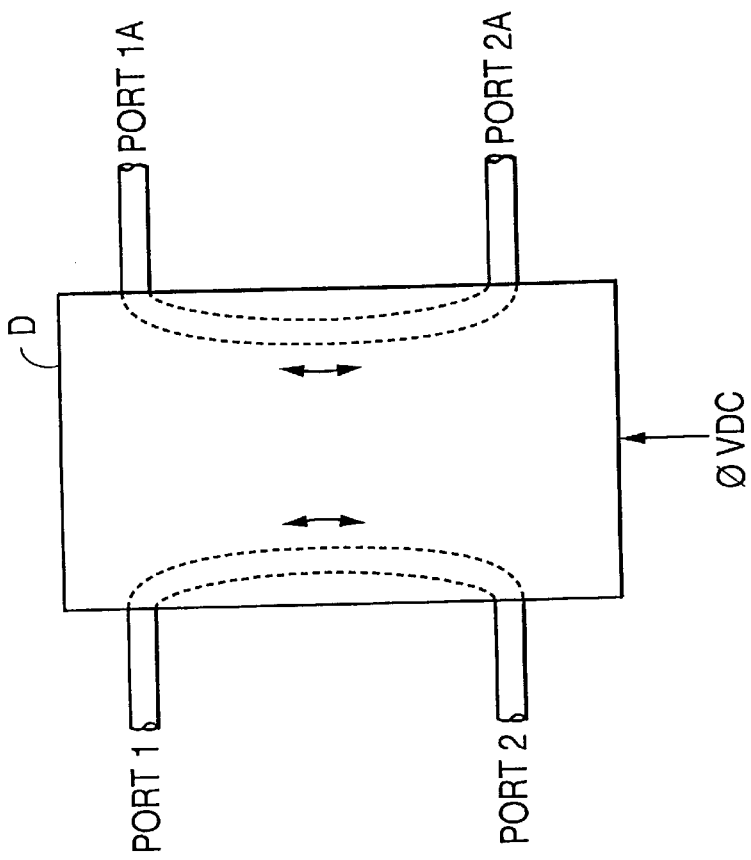
FIG. 6A illustrates the optical interconnect in a quad-port optical distributor during powered-on state.
Figure 6B:
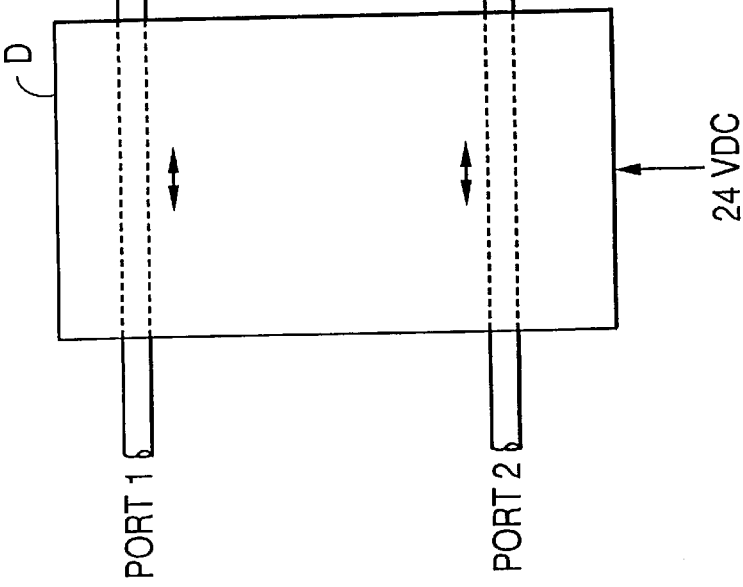
FIG. 6B illustrates the optical interconnect loop pathway in the quad-port optical distributor of FIG. 6A in the absence of power.

As explained above in relationship to FIG. 1, the overall system architecture includes four physically separate parameter-sensing channels that effect cross-channel communication via a fiber optic link. Additionally, each channel receives its operating power from a separate power supply: if the power inverter that supplies power to a single channel fails, only that channel becomes inoperative. As shown in the representative FIG. 6 for the interface & test processors ITP of the channels, each interface & test processor ITP communicates via various optical modems or transceivers XCVR via a optical fiber pathway (shown as communication bus CB in the lower part of FIG. 6). As shown, the various transceivers XCVR are inserted into and interposed in the communications bus CB. In the event power to a particular channel is lost, the loss of the associated transceivers XCVR can interrupt the optical integrity of the communications bus CB. In order to address this problem and assure the operational integrity of the communications bus, the present invention provides quadport optical distributors that default to optical redirection upon a loss of power. As shown in FIG. 6A, each optical distributor D is designed to be powered by the 24 VDC supplied by the power supply associated with its channel (i.e., channel A, channel B, channel C, or channel D). Each distributor D includes paired optical input/output ports, port 1 paired with port 1A and port 2 paired with port 2A. Additionally, each distributor includes internal optical "T" switches (not shown), or their functional equivalent, that can redirect the incoming and outgoing optical signals along one of two internal paths in accordance with their powered-on or power-off states. The optical switches are connected so that when all optical switches are powered-on, optical signals are passed directly through the distributor D between input/output port pairs. Thus, during the powered-on state, optical signals will pass between ports 1 and 1A and between ports 2 and 2A. In the powered-on state, the optical distributor is essentially transparent to the network. In the event that the power is lost in one (or more) of the channels, the optical distributor, upon loss of power, switches the optical pathway so as to effectively loop the optical signals and thereby effectively provide a loop termination so as to adapt the communications bus CB to continue operation with a missing channel. As shown in FIG. 6B, the optical switches, upon the loss of a power supply, automatically default to connect the port 1 to the port 2 and to connect the port 1A to the port 2A to effect a loop-termination on both sides of the distributor D. In the case of a loss of power in channel A and to the distributor D on the left in FIG. 6, the distributor D would default to a loop termination mode to thereby preserve the integrity of the communications bus CB for the remaining powered-on channels B, C, and D. Suitable fiber optic switches using internal solenoids to move reflectors are manufactured by Molex, Inc.

Figure 7:
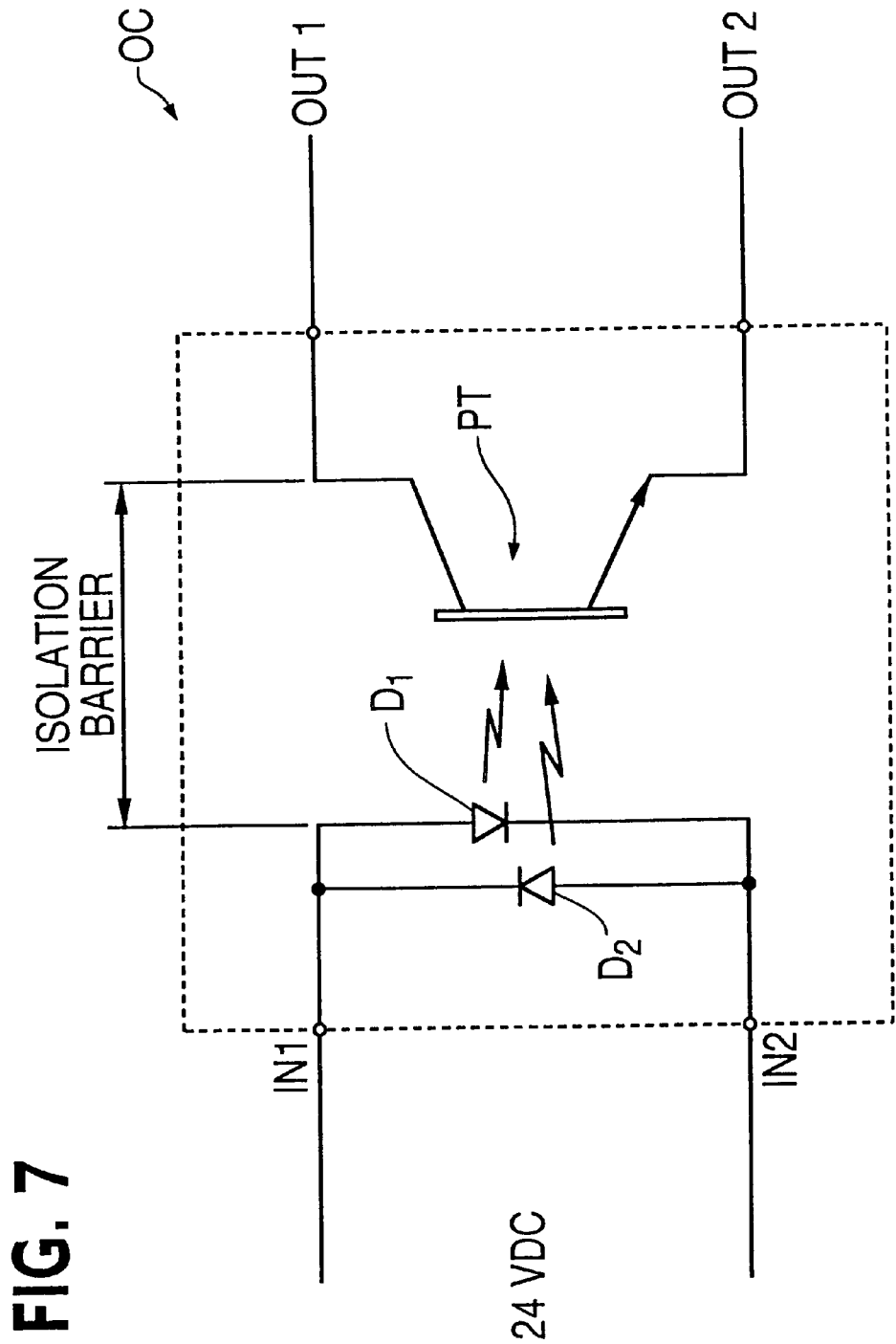
FIG. 7 is a schematic circuit of an optical coupler used to effect a measure of optical isolation.

In the design of plant protection systems it is important that circuits be isolated from one another so that an over-voltage situation in one circuit will not affect the operation of another circuit. In general, the digital plant protection system disclosed herein utilizes programmable logic controllers (PLC) that are designed to provide a 24 VDC output that is switched on or off under the control of the programmed logic. Since the PLC's are critical to system operation, it is important that they be isolated from over-voltage situations. In accordance with the present invention, system integrity is assured by utilizing optical couplers at the output of the PLC's and in all other voltage-switching contexts. As shown in FIG. 7, the optical coupler OC includes a pair of PN light emitting diodes, D1 and D2, that are parallel connected (in opposing conduction directions) across input terminals IN1 and IN2. A DC input voltage applied to the input terminals IN1 and IN2 will cause one of the two diodes (depending upon the polarity of the input voltage) to emit light. A photo-transistor PT has its emitter and base connected between output terminals OUT1 and OUT2 and undergoes a change in transconductance as a function of the light emitted by the diode(s) driven into conduction. As a consequence, voltage levels applied to the terminals IN1 and IN2 will cause a corresponding change in the transconductance of the photo-transistor PT. The input-to-output electrical isolation provided by a typical optical coupler can be in the 3–5 kilovolt range; accordingly, the isolation provided by opto-coupler can assure system integrity. In the context of digital plant protection systems, which require all devices to meet the IEEE Class 1E requirement, the use of opto-couplers in this context serves to increase system reliability.

Figure 8:
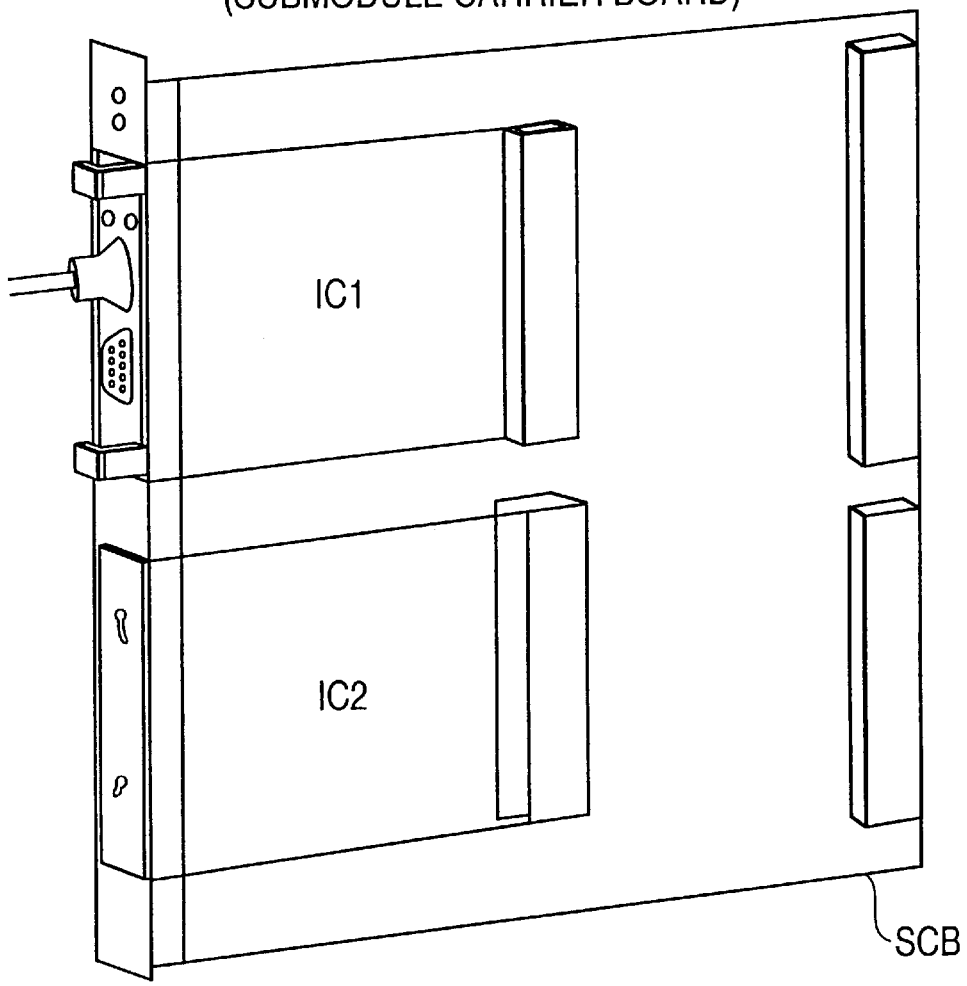
FIG. 8 is a perspective view of a submodule carrier 35 board with modem devices mounted thereof.

It is not uncommon in the design of large systems to use different types of bus protocols and communications systems. In the present invention, the bus protocol is of the basic token-ring network type. In many systems, an industry standard MODBUS is used, this system being a variant of the IEEE RS-232 standard. The present invention employs a system by which interface cards for various systems can be used to provide seamless interfacing between systems. As shown in FIG. 8, a submodule carrier board SCB is provided to accept interface cards, such as the interface cards IC1 and IC2 shown. In accordance with the present invention, at least one of those cards is an ABB CI-532 card which allows interfacing with the MODBUS system and the proprietary ABB system. The provision of interface cards allows for easy and seamless interfacing between different network protocols. FIG. 8A illustrates an application in which multi-protocol cards can be used. As shown on the lower left and right of FIG. 8A, train "A" and train "B" of the Digital Engineered Safety Features Actuation System (DESFAS) of the above referenced and incorporated patent application utilize programmable logic controllers (PLC) that communicate with the integrated test processor ITP of the digital plant protection system DPPS via fiber optic data links DL1 and DL2. In FIG. 8, the programmable logic controller PLC each have a MODBUS port. In order to effect seamless interfacing with the main system bus, the interface test processor ITP is provided with an ABB CI 535 or similar card to effect interfacing.

Figure 9:
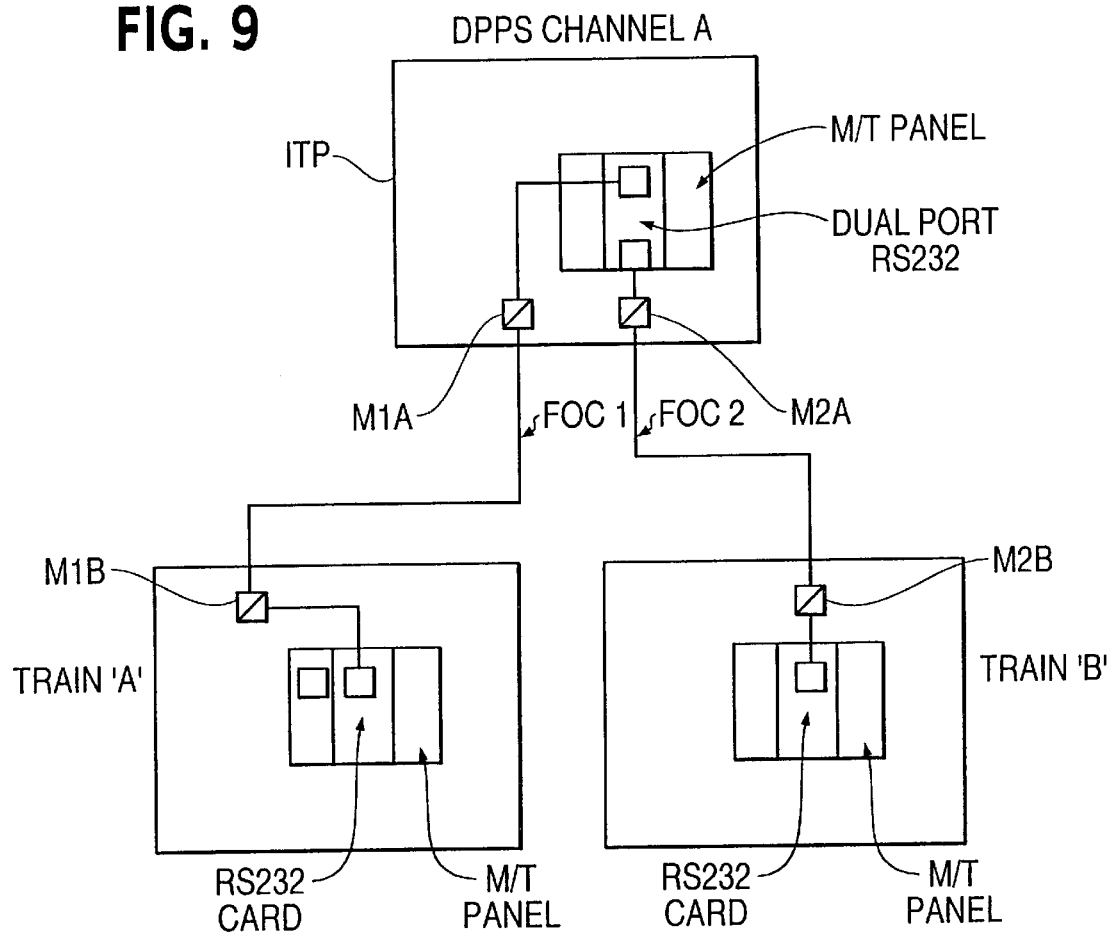
FIG. 9 is a schematic block diagram of an interface between a digital plant protection channel and two trains of the digital engineer safety feature system.

The present invention effects interfacing between the various channels of the digital plant protection system and the two trains of the DESFAS via fiber optic cable and RS-232 modems. As shown in FIG. 9, communication between the interface test processor ITP and train A and train B is accomplished over two fiber optic cables, FOC1 and FOC2. Two fiber optic modems (RS-232 standard), M1A and M2A are mounted in the maintenance/test panels M/T and coupled to the fiber optic cables FOCI and FOC2, respectively. In a similar manner, a fiber optic modem M1B is mounted in the digital engineered safety system of train "A" and another modem M2B is similarly mounted in train "B". The use of the fiber optic data links in the form of cables FOC1 and FOC2 and the related RS-232 modems eliminates previously required isolator and field termination equipment. Additionally, the number of mechanical and electrical devices is reduced compared to prior systems as well as the time required for in-the-field wiring.

Figure 10:
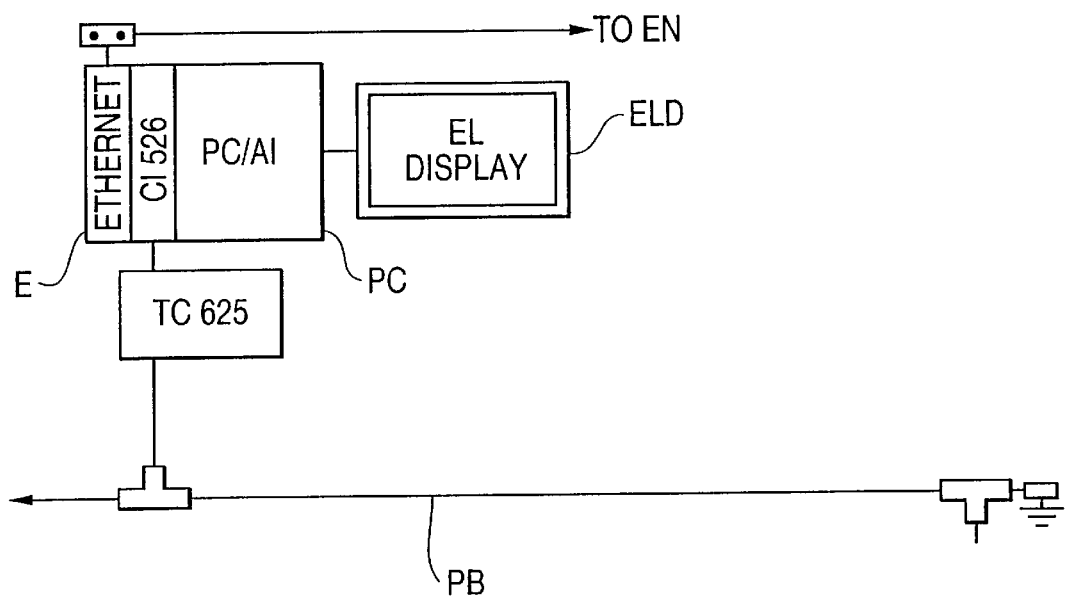
FIG. 10 is a schematic block diagram of the manner by which traffic on the communication bus of the digital plant protection system is translated to the Ethernet standard.
Figure 10A:
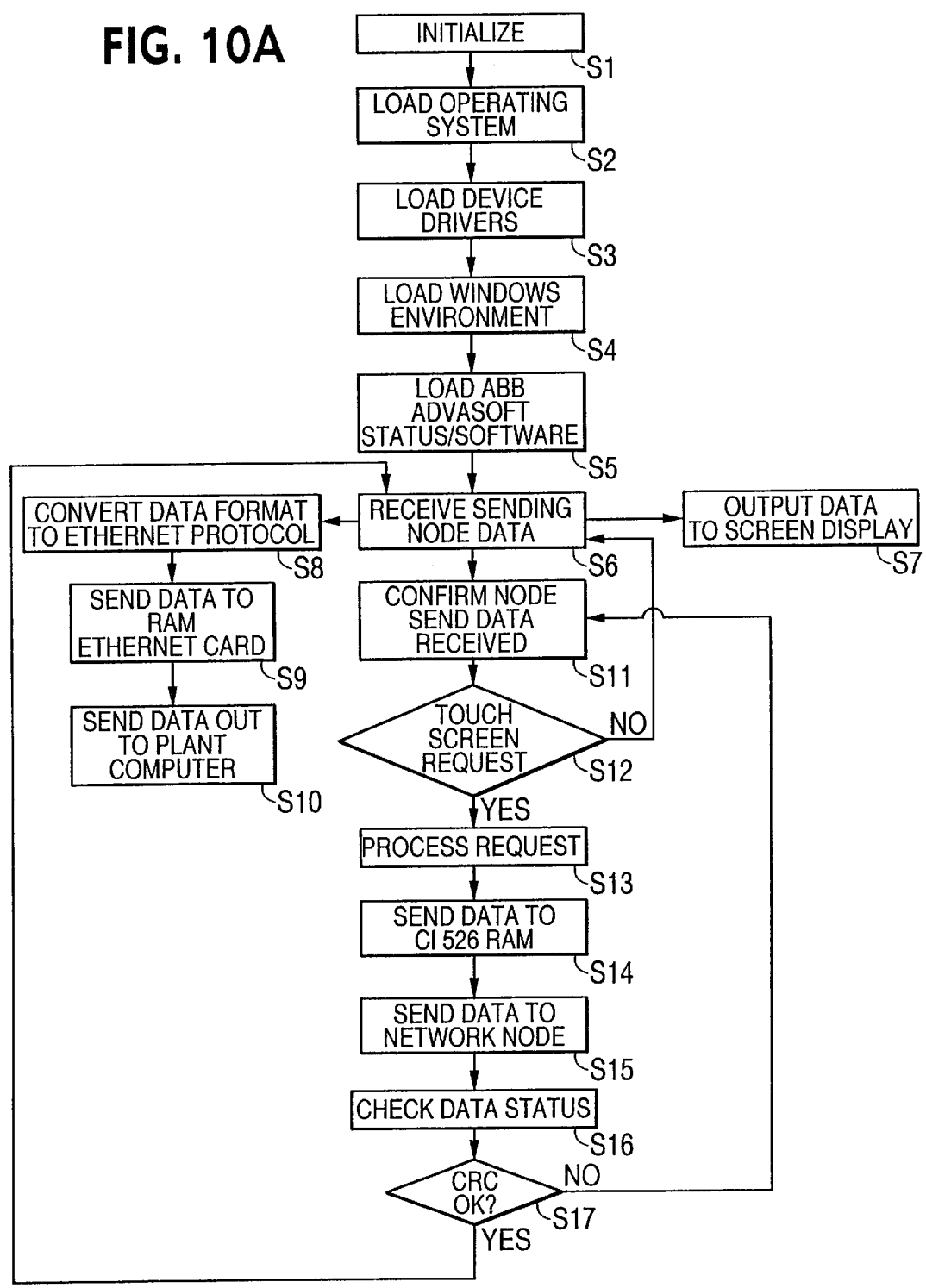
FIG. 10A is a flow diagram by which data of the block diagram of FIG. 10 is processed for Ethernet compatibility.

Equipment used in nuclear power plants must meet IEEE Category I standards, particularly with regard to the ability to survive seismic events. In general, Category I equipment is quite expensive. However, it is oftentimes appropriate to connect the plant protection system to other devices which do not require Category I capability. As shown in FIG. 10, the network interface capability is presented in which traffic on the digital plant protection system bus PB is tapped at a "IT" connector and routed to an AT-class (or higher) personal computer PC. An electro-luminescent display ELD is provided to output the computer PC video information. A CI 526 board (manufactured by ABB) in mounted on the computer PC internal bus along with a standard Ethernet card E. As explained below, the CI 526 card interfaces with the Ethernet card so that all traffic on the DPPS bus PB is translated into the Ethernet protocol for transmission on an external Ethernet EN. The CI 526 card operates pursuant to the flow diagrams of FIGS. 10A and 10B. As shown in FIG. 10A, the system is initialized and the operating system, device drivers, windows software, and the ABB "Advasoft" software is loaded (steps S1–S5) At step S6, any sending node data is received and presented for display at S7 and also converted at step S8 to Ethernet protocol. The converted data is sent to the RAM in the Ethernet card at S9 and then sent via the Ethernet protocol to the main plant computer (S10.) Additionally, requests are made at the touch-responsive screen ELD (at S12) and those requests are processed (at S13) and sent to the CI526 RAM (at S14) with the data being sent to the network node (at S15) with status checking and cyclic redundancy checking CRC being effected at S16 and S17.

Figure 10B:
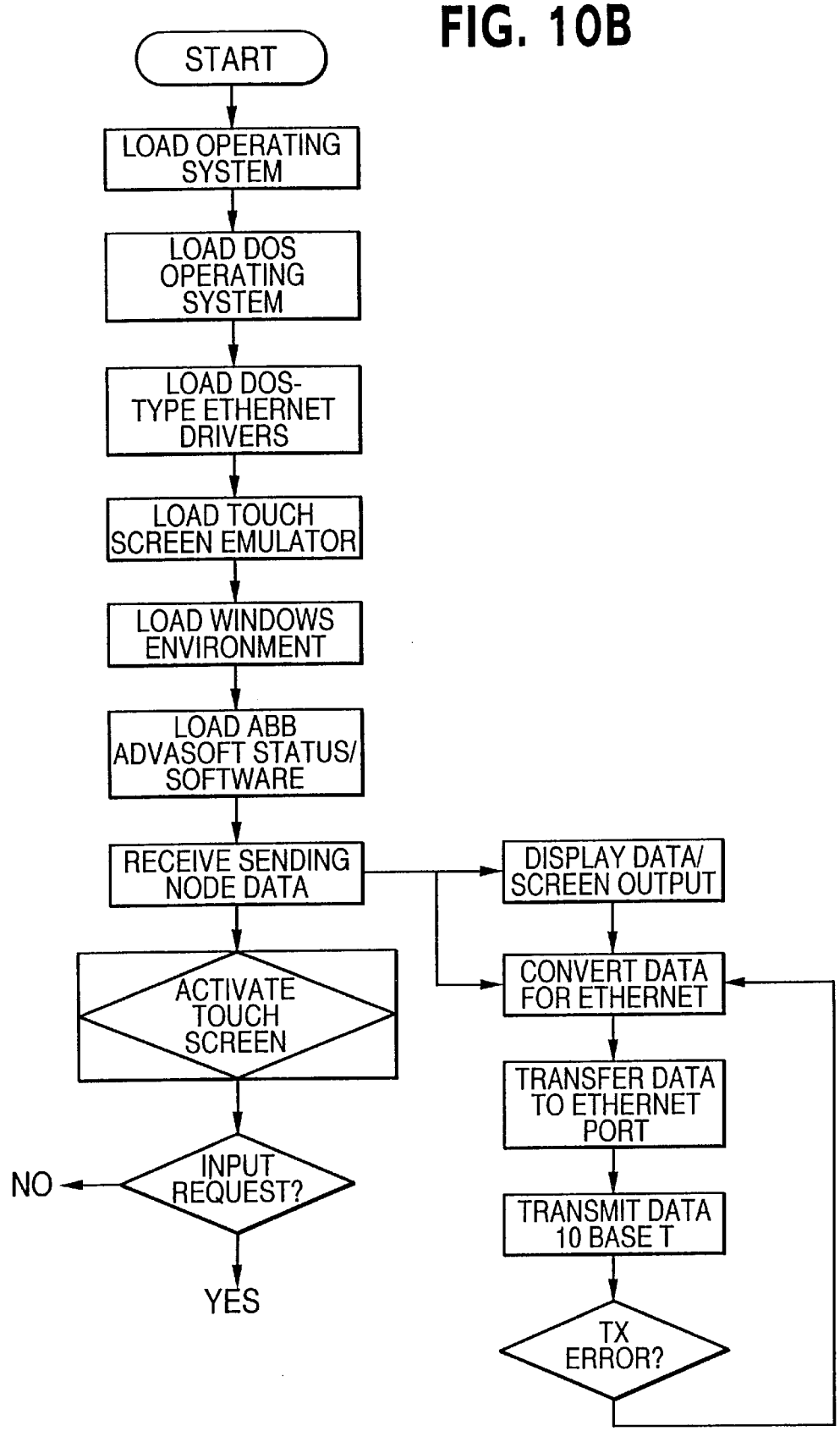
FIG. 10B is a flow diagram augmenting the flow diagram of FIG. 10A.

The flow diagram of FIG. 10B is a variant of the operational flow of FIG. 10A. As will be apparent to those skilled in the art, various changes and modifications may be made to the illustrated embodiment of the digital plant protection system of the present invention without departing from the spirit and scope of the invention as determined in the appended claims and their legal equivalent.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

What is claimed is:

1. A digital plant protection system for use in nuclear power plants, comprising:
   a plurality of substantially identical independent sensed-parameter processing channels, each of which accepts a digital value representative of a sensed-parameter;
   a digital comparator associated with each sensed-parameter processing channel for (1) comparing said digital value of the sensed-parameter with a first predetermined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected; and
   a coincidence logic processor associated with each said sensed-parameter processing channel for receiving said trip output from said digital comparator, each said coincidence logic processor being cross-connected to every sensed-parameter processing channel for receiving several trip outputs from digital comparators within each said channel, wherein said coincidence logic processor generates a trip signal for effecting remedial action upon receipt of trip outputs from at least two channels.

2. A digital plant protection system for use in nuclear power plants as in claim 1, wherein said first plurality is four.

3. A digital plant protection system for use in nuclear power plants as in claim 1, wherein each said comparator further includes a bistable processor.

4. A digital plant protection system for use in nuclear power plants as in claim 3, wherein said digital value is received by said bistable processor which effects said comparison of said digital value of the sensed-parameter with said predetermined digital value indicative of a pre-trip condition.

5. A digital plant protection system for use in nuclear power plants as in claim 4, wherein said bistable processor effects said further comparison of said digital value with said second predetermined digital value indicative of a trip condition and provides said trip output to said coincidence logic processor if said trip condition is detected.

6. A digital plant protection system for use in nuclear power plants as in claim 1, wherein said trip signal for effecting remedial action is received by a Digital Engineered Safety Features Actuation System.

7. A digital plant protection system for use in nuclear power plants as in claim 1, wherein said trip signal for effecting remedial action is received by reactor trip breakers.

8. A digital plant protection system for use in nuclear power plants as in claim 7, wherein said trip breakers are actuated using high energy relays which accommodate either 12 VDC or 24 VDC actuation outputs.

9. A digital plant protection system for use in nuclear power plants as in claim 6, wherein said trip signal for effecting remedial action is also received by reactor trip breakers.

10. A digital plant protection system for use in nuclear power plants as in claim 9, wherein said trip breakers are actuated using high energy relays which accommodate either 12 VDC or 24 VDC actuation outputs.

11. A digital plant protection system for use in nuclear power plants as in claim 10, wherein said trip signal is optically isolated from said trip breakers.

12. A digital plant protection system for use in nuclear power plants as in claim 6, wherein said trip signal is optically isolated from said Digital Engineered Safety Features Actuation System.

13. A digital plant protection system for use in nuclear power plants as in claim 1, wherein said channels are cross-connected using fiber optic data links.

14. A digital plant protection system for use in nuclear power plants as in claim 1, wherein each channel further includes a maintenance and test panel and an interface and test processor for communicating with an engineered safety features systems.

15. A digital plant protection system for use in nuclear power plants as in claim 14, wherein each said interface and test processor communicates with said engineered safety features system via fiber optic data links.

16. A digital plant protection system for use in nuclear power plants as in claim 14, wherein each said interface and test processor further includes quadport optical distributors that redirect fiber optic data upon a loss of power.

17. A digital plant protection system for use in nuclear power plants as in claim 16, wherein said optical distributors provide loop termination upon loss of power to protect fiber optic data line integrity.

18. A digital plant protection system for use in nuclear power plants as in claim 14, wherein each said interface and test processor may initiate testing of the coincidence logic processors within said channels.

19. A digital plant protection system for use in nuclear power plants as in claim 17, wherein each said interface and test processor further includes a separate I/O module and a separate programmable logic circuit.

20. A method for monitoring all safety related system parameters within a nuclear power plant, comprising:
   cross-connecting a plurality of substantially identical independent processing channels;
   within each said channel further comprising the steps of:
      receiving a plurality of conditioned digital input signals representative of a sensed parameter;
      comparing said digital input signals with a first predetermined stored digital value indicative of a pre-trip condition;
      generating and transmitting a pre-trip output to all said channels if said pre-trip condition is detected;
      receiving pre-trip signals from all said channels if said pre-trip condition is detected;
      comparing said digital input signals with a second pre-determined stored digital value indicative of a trip condition if said pre-trip output is received;
      generating and transmitting a trip output to coincidence logic processors within each said channel if said trip condition is detected, wherein said coincidence logic processors generate a trip signal if said trip output is received from two or more channels; and
      taking pre-determined corrective action if said trip signal is detected.

21. A method for monitoring all safety related system parameters within a nuclear power plant as in claim 20, wherein said step of receiving a plurality of conditioned digital input signals representative of a sensed parameter further includes the steps of:
   receiving an analog signal representative of the sensed parameter; and
   converting said analog signal to a digital signal representative of the sensed-parameter.

22. A method for monitoring all safety related system parameters within a nuclear power plant as in claim 21, wherein said step of taking pre-determined corrective action further includes the steps of:
   providing said trip signal to reactor trip breakers; and
   providing said trip signal to a Digital Engineered Safety Features Actuation System.

23. A digital plant protection system, comprising:
   means for cross-connecting a plurality of substantially identical independent processing channels;
   within each said channel further comprising:
      means for receiving a plurality of conditioned digital input signals representative of a sensed parameter;
      means for comparing said digital input signals with a first pre-determined stored digital value indicative of a pre-trip condition;
      means for generating a pre-trip output to all said channels if said pre-trip condition is detected;
      means for comparing said digital input signals with a second pre-determined stored digital value indicative of a trip condition;
      means for generating a trip output to all said channels if said trip condition is detected;
      means for receiving trip outputs from each said channel generating a trip output;
      means for providing a trip signal if said trip output is received from two or more channels; and
      means for taking pre-determined corrective action if said trip signal is detected.

24. A digital plant protection system as in claim 23, wherein said means for receiving a second plurality of conditioned digital input signals representative of a sensed parameter further includes:
   means for receiving an analog signal representative of the sensed parameter; and
   means for converting said analog signal to a digital signal representative of the sensed parameter.

25. A digital plant protection system as in claim 24, wherein said means for taking pre-determined corrective action further includes:
   means for providing said trip signal to reactor trip breakers; and
   means providing said trip signal to a Digital Engineered Safety Features Actuation System.

26. A digital plant protection system as in claim 25, wherein said means for cross-connecting and said means for receiving trip signals are each fiber optic data links.

27. A digital plant protection system for use in nuclear power plants, comprising:
   a plurality of sensors each providing an analog output representative of a sensed-parameter, each said output received by an analog-to-digital converter for providing a digital value representative of said sensed-parameter;
   four substantially identical independent sensed-parameter processing channels each of which accepts said digital value representative of said sensed-parameter;
   a digital comparator associated with each said sensed-parameter processing channel for (1) comparing said digital value of said sensed-parameter with a first predetermined digital value indicative of a pre-trip condition and generating a pre-trip output to all four of said channels if said pre-trip condition is detected and (2) comparing said digital value of said sensed-parameter with a second predetermined digital value indicative of a trip condition and generating a trip output to all four of said channels if said trip condition is detected; and
   a coincidence logic processor associated with each said sensed-parameter processing channel for receiving said trip output from said digital comparator, each said coincidence logic processor being cross-connected to every sensed-parameter processing channel for receiving separate trip outputs from digital comparators within each said channel, wherein said coincidence logic processor generates a trip signal for effecting remedial action upon receipt of two-out-of-four trip outputs from said digital comparators within each said channel, wherein said trip signal for effecting remedial action is received by a Digital Engineered Safety Features Actuation System and by reactor trip breaks.

28. A digital plant protection system for use in nuclear power plants, comprising:
   a plurality of substantially identical independent sensed-parameter processing channels, each of which accepts a digital value representative of a sensed-parameter;
   a digital comparator associated with each sensed-parameter processing channel for (1) comparing said digital value of the sensed-parameter with a first pre-determined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected; and
   a coincidence logic processor associated with each said sensed-parameter processing channel for receiving said trip output from said digital comparator, each said coincidence logic processor being cross-connected to every sensed-parameter processing channel for receiving several trip outputs from digital comparators within each said channel, wherein said coincidence logic processor generates a trip signal for effecting remedial action upon receipt of trip outputs from at least two channels, and wherein said trip signal for effecting remedial action is received by reactor trip breakers which are actuated using high energy relays which accommodate either 12 VDC or 24 VDC actuation outputs.

29. A digital plant protection system for use in nuclear power plants, comprising:
   a plurality of substantially identical independent sensed-parameter processing channels, each of which accepts a digital value representative of a sensed-parameter;
   a digital comparator associated with each sensed-parameter processing channel for (1) comparing said digital value of the sensed-parameter with a first pre-determined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected; and a coincidence logic processor associated with each said sensed-parameter processing channel for receiving said trip output from said digital comparator, each said coincidence logic processor being cross-connected to every sensed-parameter processing channel for receiving several trip outputs from digital comparators within each said channel, wherein said coincidence logic processor generates a trip signal for effecting remedial action upon receipt of trip outputs from at least two channels, and wherein said trip signal for effecting remedial action is received by a Digital Engineered Safety Features Actuation System and by reactor trip breakers, said reactor trip breakers being actuated using high energy relays which accommodate either 12 VDC or 24 VDC actuation outputs.

30. A digital plant protection system for use in nuclear power plants, comprising:

a plurality of substantially identical independent sensed-parameter processing channels, each of which accepts a digital value representative of a sensed-parameter;

a digital comparator associated with each sensed-parameter processing channel for (1) comparing said digital value of the sensed-parameter with a first predetermined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected;

a coincidence logic processor associated with each said sensed-parameter processing channel for receiving said trip output from said digital comparator, said coincidence logic processor cross-connected to every sensed-parameter processing channel for receiving several trip outputs from digital comparators within each said channel, wherein said coincidence logic processor generates a trip signal for effecting remedial action upon receipt of trip outputs from at least two channels; and a maintenance and test panel and an interface and test processor associated with each channel for communicating with an engineered safety features system, wherein each said interface and test processor includes quadport optical distributors that redirect fiber optic data upon a loss of power.

31. A digital plant protection system for use in nuclear power plants, comprising:

a plurality of substantially identical independent sensed-parameter processing channels, each of which accepts a digital value representative of a sensed-parameter;

a digital comparator associated with each sensed-parameter processing channel for (1) comparing said digital value of the sensed-parameter with a first predetermined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected;

a coincidence logic processor associated with each said sensed-parameter processing channel for receiving said trip output from said digital comparator, each said coincidence logic processor being cross-connected to every sensed-parameter processing channel for receiving several trip outputs from digital comparators within each said channel, wherein said coincidence logic processor generates a trip signal for effecting remedial action upon receipt of trip outputs from at least two channels; and a maintenance and test panel and an interface and test processor associated with each channel for communicating with an engineered safety features system, wherein each said interface and test processor includes quadport optical distributors that, upon loss of power, (1) redirect fiber optic data and (2) provide loop termination to protect fiber optic data line integrity.

32. A digital plant protection system for use in nuclear power plants, comprising:

a plurality of substantially identical independent sensed-parameter processing channels, each of which accepts a digital value representative of a sensed-parameter;

a digital comparator associated with each sensed-parameter processing channel for (1) comparing said digital value of the sensed-parameter with a first predetermined digital value indicative of a pre-trip condition and generating a pre-trip output if said pre-trip condition is detected, and (2) further comparing said digital value of the sensed-parameter with a second predetermined digital value indicative of a trip condition and generating a trip output if said trip condition is detected; and a coincidence logic processor associated with each said sensed-parameter processing channel for receiving said trip output from said digital comparator, each said coincidence logic processor being cross-connected to every sensed-parameter processing channel for receiving several trip outputs from digital comparators within each said channel, wherein said coincidence logic processor generates a trip signal for effecting remedial action upon receipt of trip outputs from at least two channels; and a maintenance and test panel and an interface and test processor associated with each channel for communicating with an engineered safety features systems, wherein each said interface and test processor includes quadport optical distributors that, upon loss of power, (1) redirect fiber optic data and (2) provide loop termination to protect fiber optic data line integrity, and wherein each said interface and test processor further includes a separate I/O module and a separate programmable logic circuit.

* * * * *